United States Patent [19]

Alexander

[11] Patent Number: 4,886,550

[45] Date of Patent: * Dec. 12, 1989

[54] FLEXIBLE GROUT COMPOSITION AND METHOD

[75] Inventor: William Alexander, Naperville, Ill.

[73] Assignee: American Colloid Company, Arlington Heights, Ill.

[*] Notice: The portion of the term of this patent subsequent to Sep. 29, 2004 has been disclaimed.

[21] Appl. No.: 251,804

[22] Filed: Oct. 3, 1988

Related U.S. Application Data

[63] Continuation-in-part of Ser. No. 61,493, Jun. 15, 1987, Pat. No. 4,797,158, which is a continuation-in-part of Ser. No. 849,048, Apr. 7, 1986, Pat. No. 4,696,699, which is a continuation-in-part of Ser. No. 787,505, Oct. 15, 1985, Pat. No. 4,696,698.

[51] Int. Cl.$^4$ .............................................. C04B 12/04
[52] U.S. Cl. ........................................ 106/74; 106/84; 405/267
[58] Field of Search ..................... 106/74, 84; 405/267

[56] References Cited

U.S. PATENT DOCUMENTS

| 4,696,698 | 9/1987 | Harriet | 106/74 |
| 4,696,699 | 9/1987 | Harriet | 106/74 |
| 4,797,159 | 1/1989 | Harriet | 106/74 |

Primary Examiner—Brian E. Hearn
Assistant Examiner—Andrew Griffis
Attorney, Agent, or Firm—Mason, Kolehmainen, Rathburn & Wyss

[57] ABSTRACT

A flexible grout composition is used to cement a conduit within a bore hole to prevent fluid loss, for sealing and grouting well casings, plugging abandoned wells, and waterproofing earthen structures. The flexible grout composition consists essentially of water, a water-swellable clay, such as bentonite; optionally a particulate filler; and a dispersing agent for the water-swellable clay, such as sodium acid pyrophosphate (SAPP). The grout composition is mixed with water to form a slurry and the slurry is pumped into its intended location, for example, within the annulus defined between an outer surface of a conduit or casing disposed within a bore hole, and the surrounding earthen formation formed, for example, by drilling.

18 Claims, No Drawings

FLEXIBLE GROUT COMPOSITION AND METHOD

CROSS REFERENCE TO RELATED APPLICATION

This application is a continuation in part of copending application Ser. No. 61,493, filed June 15, 1987, now U.S. Pat. No. 4,797,158 which is a continuation-in-part of application Ser. No. 849,048, filed Apr. 7, 1986, now U.S. Pat. No. 4,696,699, which is a continuation-in-part of copendigg application Ser. No. 787,505, now U.S. Pat. No. 4,696,698.

FIELD OF THE INVENTION

The present invention is directed to a settable grout composition particularly useful in the well and geotechnical industries for sealing and grouting well casings, plugging abandoned wells, and waterproofing earthen structures. More particularly, the present invention is directed to a grout composition mixable with water to form a thixotropic slurry capable of sealing and grouting well casings, plugging abandoned wells, and sealing earthen structures at new and unexpected high solids (water-swellable clay) contents to achieve new and unexpectedly low permeabilities. The grout composition is particularly useful in cementing conduit into mine shafts, water wells, oil wells, waste-disposal wells, steam producing wells, thermal recovery wells and other types of wells, particularly in perma-frost environments. The conduit is cemented in place by filling the slurry into an annular space between the outer surface of the conduit and the surrounding earthen formation to prevent fluid loss from the well.

BACKGROUND OF THE INVENTION AND PRIOR ART

Thixotropic cement slurries have been used for many years in cementing conduits into drilled bore holes to prevent fluid loss from the well to the surrounding earthen formation. The prior art suggests a number of compositions mixable with water to form a slurry capable of reducing the fluid loss to the surrounding formation or capable of providing a hardened cement to permanently set the conduit into position without fluid loss. Among these prior art compositions, it is known to use bentonite clay in pellet or slurry form to prevent fluid loss and it is known to use a mixture of bentonite clay with Portland cement settable to a hard condition for permanently fixing the conduit within the bore hole. The following patents disclose various soil sealing compositions:

Mason U.S. Pat. No. 4,463,808 discloses a well fluid and bore hole sealing composition including water, a water-swellable clay and a water-dispersible polymer, such as an emulsion polymerized hydrolyzed polyacrylamide to prevent the immediate hydration of the clay.

Tazawa et al U.S. Pat. No. 4,004,428 is directed to a process for stabilizing soil by injecting into the soil a grout mixture comprising an aqueous sodium silicate solution, an aqueous solution of a gelling agent consisting of chlorides, sulfates and nitrates of aluminum, magnesium and iron and then gelling the injected mixture in the soil by adding at least one oxy acid.

The Kim et al U.S. Pat. No. 3,615,780 is directed to the gelling of an aqueous solution of vegetable polyphenolic material derived from coniferous tree bark or tannins of catechin or condensed type by reaction with alkali metal silicates, preferably sodium or potassium silicate. The compositions may be modified with additional material such as bentonite clay, Portland cement and the like.

The Chesney, Jr. et al U.S. Pat. No. 4,447,267 is directed to a Portland cement based grout composition including bentonite clay, a filler and a composite of a cellulose ether and a long chain polymer, such as polyacrylamide.

Crinkelmeyer et al U.S. Pat. No. 4,102,400 is directed to a composition for contacting a well bore prior to disposing a thixotropic cement slurry in the well bore to initially prepare the well bore to prevent fluid loss. The slurry, used prior to the cement, is a gel formed by the reaction of a silicate with a multivalent metal cation; an inert particulate filler and a water-dispersible cellulose compound. This fluid is referred to as a "spacer fluid" since the fluid is frequently used ahead of the cement to displace the drilling mud from the bore hole.

Cementing or grouting of steel well casings in well bores dates back to the early twentieth century. Early uses were directed to filling a cement grout in the well bore annulus surrounding the casing to separate water from oil producing zones and for the completion of water wells. Wells are cased and cemented down to at least a lowest possible pumping level to prevent contamination of the pumped fluid from the surrounding earthen formation. In the case of impervious strata above the oil or water producing gravel or sand, the cement should extend from the surface down to the impervious strata. Further, more and more attention is now given to proper plugging of abandoned wells for the purpose of environmental protection. Cementing or grouting of abandoned wells is an environmentally acceptable procedure. The cement or grout cements the annular space between a hole and a liner or casing, and enters cavities in the surrounding earthen formation to seal the earthen formation against fluids entering the annular space.

The most typical cement compositions used in preventing well bore contamination and for plugging abandoned wells include bentonite clay pellets; neat cement compositions and compositions including both Portland cement and bentonite clay. Bentonite clay pellets, while generally effective in providing a water-impermeable layer surrounding the well casing, are difficult to position within the well bore annulus surrounding the well casing, particularly in small annular spaces. Bentonite pellets are dropped within the annular space and fall randomly creating various sized void spaces between pellets at different locations. The pellets sometimes become sticky and are difficult to drop within small annular spaces, but, if properly positioned, are effective because of the high concentration of water-swellable bentonite, such as sodium bentonite. Generally, although the pellets themselves are essentially 100% bentonite, spacing between pellets creates effectively about a 50% to 60% bentonite concentration within the annular space. The pellets must be positioned in their intended location prior to complete hydration so that, once positioned, the clay can swell to eliminate the void spaces. Consequently, bentonite pellets have a maximum useable depth through water of about 500 feet. The composition of the present invention has no initial void spaces and can displace water in a well annulus to depths of more than 1000 feet.

Water-swellable bentonite clay, when used together with Portland cement, aids in reducing shrinkage of the cement or grout composition but, still, substantial shrinkage occurs, sometimes resulting in undesirable inter-aquifer transfer. Other problems encountered with the above-described prior art cement compositions include a high alkalinity which can alter geotech analyses that rely on accurate pH determination for detection of metal ion contamination; permeability of the cement or grout composition after setting because of the properties of the composition or because of cracking of the cement due to ground shifting; the expense of Portland cement; heating of the cement or grout during curing causing weakening of the well casing, particularly where polymeric casings are used; corrosion of the iron containing well casings because of toxicity of the cement or grout composition, or due to inadequate filling, e.g. shrinkage or cracking of the composition within the annulus, resulting in contamination of the recovered fluid or inadequate well plugging; abrasiveness of the cement or grout on the mixing equipment; initial relatively high viscosity of the composition when mixed with water resulting in more difficulty in completely filling an annulus, with bridging sometimes occurring in the annulus causing inter-zone transfer of fluid and/or contamination; and a non-flexible set cement resulting in cracking upon ground shifting or shrinkage and fluid contamination. The composition of the present invention solves or improves each of the deficiencies in the above-described prior art compositions.

SUMMARY OF THE INVENTION

In brief, the present invention is directed to a flexible grout composition and method of disposing the composition within a bore hole, for example to cement a conduit within the bore hole to prevent fluid loss, for sealing and grouting well casings, plugging abandoned wells, and waterproofing earthen structures. The flexible grout composition includes a water-swellable clay, such as bentonite; and a dispersing agent for the water-swellable clay, particularly an inorganic dispersing agent such as sodium acid pyrophosphate. Optionally, the composition can include a solid particulate filler, particularly an essentially non-swellable bentonite clay, such as calcium bentonite, herein defined as a bentonite clay having calcium as the predominant exchangeable cation.

In accordance with an important feature of the present invention, the composition is capable of new and unexpectedly high solids contents to achieve new and unexpectedly low permeabilities when the composition includes no water-soluble silicate, and no gelling agent for the water-swellable clay. The composition gels in place with essentially no water-soluble silicate and with essentially no gelling agent for the water-swellable clay in the composition.

The grout composition is mixed with water to form a slurry and the slurry is pumped into its intended location, for example, within the annulus defined between an outer surface of a conduit or casing disposed within a bore hole, and the surrounding earthen formation formed, for example, by drilling.

It should be understood that the composition of the present invention is useful in any environment where it is desirable to protect a structure against liquid contact, and particularly against water contact. Within the first five hours after the solid grout composition of the present invention is mixed with water, the slurry begins to gel, and between five and eight hours after mixing, the viscosity of the slurry reaches a point that it is no longer pumpable. Mixing of the grout compositions can be accomplished with any suitable equipment or method such as a cement mixer, mortar mixer, or by hand, in an amount sufficient to essentially free the slurry from lumps. After about eight hours the composition loses its thixotropy and has an initial set. Between about 8 and 24 hours the composition initially cures and reaches a rigid gel state. Within 24 to 72 hours, the composition reaches its final cure and achieves new and unexpected structural strength for a flexible grouting material.

In accordance with an important feature of the present invention, even after 72 hours or more after mixing, when the composition is completely cured, the grout material of the present invention is flexible, remains moldable, and, if a crack develops in the composition, water contact will cause the composition to expand to self-seal or fill in the crack to make the composition impermeable again. The cured composition is relatively hard having the consistency of a stiff paste, such as a glazing compound or spackling compound, while unexpectedly being more impermeable to water than typical prior art Portland cement-containing compositions.

Accordingly, an object of the present invention is to provide a new and improved water-impermeable, flexible grout material.

Another object of the present invention is to provide a new and improved flexible grout material, containing essentially no Portland cement, and having the properties of essentially no heating or shrinking during curing.

Another object of the present invention is to provide a new and improved composition for cementing a conduit within a bore hole which maintains swellability and moldability after final curing so that the composition has the capability of self-healing if a crack develops, for example by ground movement surrounding the bore hole.

Another object of the present invention is to provide a new and improved flexible grout composition containing essentially only a water-swellable clay, water, and a dispersing agent for the water-swellable clay.

Still another object of the present invention is to provide a new and improved grout composition for filling an annulus between a conduit and a surrounding earthen formation formed by drilling or other excavation process wherein the composition can be pumped into a desired location in the form of a relatively low viscosity slurry for "ease of placement" and, after complete setting, the composition maintains a moldable, swellable consistency such as dense native clay, or other stiff pastes such as spackling compounds or glazing compounds such that if the conduit develops a void or aperture, the composition will fill the void to self-seal the conduit to prevent water flow between the earthen formation and the conduit.

Still other objects of the present invention are to provide a new and improved flexible or grout composition having the properties of improved water-impermeability; cost effectiveness; decreased heating and shrinking upon curing; maintenance of flexibility so that the composition has the property of self-healing; the composition is easier to mix and is less abrasive to drilling equipment and other apparatus; the composition has a lower viscosity than prior art cement compositions when initially mixed and maintains this lower viscosity for a longer period of time than prior art cement compositions; the composition is easier to clean from mixing and applicating equipment with water and is more corrosion resistant than prior art compositions; and the composition unexpectedly is more impermeable to water than prior art Portland cement-containing compositions which set to hard, crackable consistencies.

The above and other objects and advantages of the present invention will become more apparent from the following detailed description of the preferred embodiment.

DETAILED DESCRIPTION OF THE PREFERRED EMBODIMENT

The dry grout (prior to admixture with water) of the present invention, for later admixture with water, includes a water-swellable clay, such as bentonite, in an amount of 80 to 99.5% by weight of the composition; optionally, a solid, particulate filler, particularly an essentially non-swellable colloidal clay, such as calcium bentonite, in an amount of 0 to 20% by wight of the composition, particularly 10-19.5% by weight of the composition; and a dispersing agent for the water-swellable clay, particularly an inorganic dispersing agent, such as sodium acid pyrophosphate in an amount of 0.5 to 20%, particularly 7-17% by weight of the water-swellable clay.

The water-swellable clays useful in the grout compositions of the present invention include any water-swellable colloidal clay which will substantially hydrate in the presence of water, e.g., will swell substantially (greater than 10% by volume) in the presence of water. The water-swellable colloidal clay may be any member of the dioctahedral or trioctahedral smectite group or mixtures thereof. Examples are Beidellite, Nontronite, Hectorite and Saponite. The clay also may be Attapulgite. Generally the water-swellable clay is included in the composition in finely divided form, e.g., 150 to 350 mesh.

To achieve the full advantage of the present invention, complete gelling of the water-swellable clay in the composition is delayed until the composition is disposed in place in contact with an earthen formation or otherwise surrounding a structure to be protected against contact by water by the water-impermeable grout composition. In this manner, the amount of water-swellable clay and other solids, such as the particulate filler, can be substantially increased while providing a pumpable slurry capable of being pumped into its intended location. Premature complete gelling of the water-swellable bentonite portion of the grout composition prior to pumping the composition into its intended location would necessarily limit the solids content of the pumpable composition substantially below that attainable by delayed complete gelling. The gelling of the clay is delayed by including the dispersing agent in the composition in an amount of 0.5-20% by weight of the clay, and particularly in an amount of 7% to 17% based on the dry weight of the water-swellable clay.

The particulate fillers suitable in the composition of the present invention in an amount of 0% to 20% by weight of the dry grout composition, and particularly 5% to 20% by weight, can be any water-insoluble particulate material, including calcium bentonite, and particularly inert materials such as powdered silica materials, e.g. silica flour, talc, kaolin, illite, dolomite, mineral fillers including sand, rock, stone, pearlite particles, vermiculite, and other suitable inorganic particulate materials. To achieve the full advantage of this embodiment of the present invention, the solid particulate filler material is an essentially non water-swellable colloidal clay, particularly calcium bentonite. It has been found that the non water-swellable colloidal clays, particularly the non-swellable bentonites, such as calcium bentonite, prevent the breakdown of the grout composition after freezing, as would occur with some other solid fillers. Breakdown of the grout composition after freezing causes a substantial reduction in compression strength.

Water is added to the solid grout composition in an amount of 25% to 85% by weight of the water, water-swellable clay and filler, so that when the slurry is disposed in place in contact with an earthen formation to prevent water penetration from the earthen formation through the composition, the water-swellable clay will absorb the water and form a gel, substantially eliminating shrinkage from the grout composition except at the atmosphere-contacting surface of the composition. To achieve the full advantage of the present invention, the composition, after admixture with water, includes about 15-50% by weight water-swellable clay, particularly 25-50% water-swellable clay; 0-25% by weight filler; 0.075 to 10% dispersing agent; and 25-85% by weight water, where percentages are in percent by weight of the water-swellable clay, water and filler. The dispersing agent for the water-swellable clay is included in the composition in an amount of 0.5 to 20% based on the dry weight of the water-swellable clay. To achieve the fullest advantage of the present invention, the composition, after admixture with water, includes, where percentages of the water-swellable clay, water and filler are based on the total weight of those three components: 35-70% water; 30-40% water-swellable clay, such as bentonite; 0-25% particulate filler; and 7 to 17% dispersing agent for the water-swellable clay, based on the dry weight of the water-swellable clay.

It has been found that if the slurry contains more than about 85% by weight water, the water-swellable clay will not gel and therefore will not develop the properties necessary for the cement or grout composition in accordance with the present invention. In accordance with an important feature of the present invention, the water-swellable clay absorbs the slurry water upon hydration thereby preventing the composition from shrinking upon curing. Otherwise, upon water evaporation or water lost to the surrounding formation, the composition would occupy the original solids volume, thereby substantially shrinking upon curing. The final cured structure is a gel which is resistant to erosion and is non-migratory and prevents the ingress of water into the composition.

EXAMPLE

An exemplary grout composition is prepared by mixing in a suitable mixer 100 grams of untreated bentonite clay (dry weight basis) and 15 grams of sodium acid pyrophosphate (SAPP). The 100 grams of clay and 15 grams of SAPP were added to (A) 333.33 grams of water; and (B) 385.71 grams of water to make up slurry A comprising bout 30% bentonite clay solids by total weight of the slurry; and slurry B comprising about 35% bentonite clay solids by total weight of the slurry.

The slurry compositions at 30% and 35% by weight of bentonite clay and 15% sodium acid pyrophosphate based on the dry weight of the clay were compared to the previous composition of U.S. Pat. Nos. 4,696,698 and 4,996,699 containing 20% by weight bentonite clay. On a dry weight basis, the prior art clay contained 93% bentonite clay, 4.2% sodium silicate and 2.8% sodium acid pyrophosphate—based on this combination 2.5% by weight MgO was then added. The entire combination was diluted with water to form a slurry containing 20% bentonite clay. The date is set forth in Table I:

TABLE I

PENETROMETER TESTING OF GROUT

| Time (hours) | Volclay Grout U.S. Pat. Nos. 4,696,698 and 4,696,699 | Penetration (mm) Bentogrout II (30.0% bentonite) | Bentogrout II (35.0% bentonite) |
|---|---|---|---|
| 0 | 85 | 85 | 74.0 |
| 2 | 41.4 | 73.5 | 53.0 |
| 5 | 34.5 | 64.5 | 48.0 |
| 7 | 42.0 | 57.5 | 45.0 |
| 8 | 38.5 | 52.0 | 36.5 |
| 24 | 38.0 | 45.4 | 42.5 |
| 48 | 40.5 | 53.0 | 43.0 |
| 72 | 38.5 | 52.0 | 40.0 |
| 96 | 40.0 | 49.5 | 39.5 |

The slurrys were blended using a Ribbon blender. Once blended, the solids were added to deionized water in a Hobart mixer, set on the lowest mixing speed. After adding the blend, the grout was allowed to mix for 10 minutes on the highest speed, scraping the sides of the bowl periodically. Separate containers were filled for each measurement and the containers were covered while the grout was setting up.

Surprisingly, the compositions of the present invention remained flexible while achieving equivalent penetrometer readings to the group composition containing the sodium silicate and magnesium oxide while achieving much higher water-swellable clay percentages (30% to 35% compared to 20%) to achieve new and unexpectedly low permeabilities.

The permeability data for the 30% bentonite clay grout of the Example is set forth in Tables II–IV, and surprisingly is better than the industry standard for coefficient of permeability of $1 \times 10^{-7}$:

TABLE II

30% GROUT COLUMN - NO SALT

| TIME | MLS LOST | CUMULATIVE MLS LOST | COEFFICIENT OF PERMEABILITY |
|---|---|---|---|
| Day 1 | 6.5 | 6.5 | $6.7 \times 10^{-8}$ |
| Day 2 | 6 | 12.5 | $6.2 \times 10^{-8}$ |
| Day 3 | 6.5 | 19 | $6.7 \times 10^{-8}$ |
| Day 4 | 5 | 24 | $5.1 \times 10^{-8}$ |
| Day 7 | 16 | 40 | $5.5 \times 10^{-8}$ |
| Day 8 | 5 | 45 | $5.1 \times 10^{-8}$ |
| Day 9 | 5 | 50 | $5.1 \times 10^{-8}$ |
| Day 10 | 5 | 55 | $5.1 \times 10^{-8}$ |
| Day 11 | 5 | 60 | $5.1 \times 10^{-8}$ |
| Day 14 | 13 | 73 | $4.5 \times 10^{-8}$ |
| Day 15 | 4 | 77 | $4.1 \times 10^{-8}$ |
| Day 16 | 4 | 81 | $4.1 \times 10^{-8}$ |
| Day 17 | 4 | 85 | $4.1 \times 10^{-8}$ |
| Day 18 | 5 | 90 | $5.1 \times 10^{-8}$ |
| Day 21 | 12 | 102 | $4.1 \times 10^{-8}$ |
| Day 22 | 5 | 107 | $5.1 \times 10^{-8}$ |
| Day 23 | 4.5 | 111.5 | $4.6 \times 10^{-8}$ |
| Day 24 | 5 | 116.5 | $5.1 \times 10^{-8}$ |
| Day 25 | 4 | 120.5 | $4.1 \times 10^{-8}$ |
| Day 28 | 10 | 130.5 | $3.4 \times 10^{-8}$ |
| Day 29 | 3.5 | 134 | $3.6 \times 10^{-8}$ |
| Day 30 | 3.5 | 137.5 | $3.6 \times 10^{-8}$ |
| Day 31 | 4 | 141.5 | $4.1 \times 10^{-8}$ |
| Day 32 | 4 | 145.5 | $4.1 \times 10^{-8}$ |
| Day 35 | 11 | 156.5 | $3.8 \times 10^{-8}$ |
| Day 36 | 4 | 160.5 | $4.1 \times 10^{-8}$ |
| Day 37 | 4 | 164.5 | $4.1 \times 10^{-8}$ |
| Day 38 | 4 | 168.5 | $4.1 \times 10^{-8}$ |
| Day 39 | 3 | 171.5 | $3.1 \times 10^{-8}$ |

TABLE III

30% GROUT FORMULATION - 5000 PPM NaCl

| TIME | MLS LOST | CUMULATIVE MLS LOST | COEFFICIENT OF PERMEABILITY |
|---|---|---|---|
| Day 1 | 18 | 18 | $6.2 \times 10^{-8}$ |
| Day 2 | 5 | 23 | $5.1 \times 10^{-8}$ |
| Day 3 | 5 | 28 | $5.1 \times 10^{-8}$ |
| Day 4 | 5.5 | 33.5 | $5.7 \times 10^{-8}$ |
| Day 5 | 4 | 37.5 | $4.1 \times 10^{-8}$ |
| Day 8 | 11 | 48.5 | $3.8 \times 10^{-8}$ |
| Day 9 | 4 | 52.5 | $4.1 \times 10^{-8}$ |
| Day 10 | 3.5 | 56 | $3.6 \times 10^{-8}$ |
| Day 11 | 5 | 61 | $5.1 \times 10^{-8}$ |
| Day 12 | 5 | 66 | $5.1 \times 10^{-8}$ |
| Day 15 | 11 | 77 | $3.8 \times 10^{-8}$ |
| Day 16 | 4 | 81 | $4.1 \times 10^{-8}$ |
| Day 17 | 5 | 86 | $5.1 \times 10^{-8}$ |
| Day 18 | 4.5 | 90.5 | $4.6 \times 10^{-8}$ |
| Day 19 | 4 | 94.5 | $4.1 \times 10^{-8}$ |

TABLE IV

30% GROUT COLUMN - 10,000 PPM NaCl

| TIME | MLS LOST | CUMULATIVE MLS LOST | COEFFICIENT OF PERMEABILITY |
|---|---|---|---|
| Day 1 | 16 | 16 | $1.7 \times 10^{-7}$ |
| Day 2 | 11 | 27 | $1.1 \times 10^{-7}$ |
| Day 3 | 10 | 37 | $1.0 \times 10^{-7}$ |
| Day 4 | 8 | 45 | $8.2 \times 10^{-8}$ |
| Day 7 | 21 | 66 | $7.2 \times 10^{-8}$ |
| Day 8 | 6 | 72 | $6.2 \times 10^{-8}$ |
| Day 9 | 5 | 77 | $5.1 \times 10^{-8}$ |
| Day 10 | 6 | 83 | $6.2 \times 10^{-8}$ |
| Day 11 | 5 | 88 | $5.1 \times 10^{-8}$ |
| Day 14 | 13 | 101 | $4.5 \times 10^{-8}$ |
| Day 15 | 4 | 105 | $4.1 \times 10^{-8}$ |
| Day 16 | 5 | 110 | $5.1 \times 10^{-8}$ |
| Day 17 | 4 | 114 | $4.1 \times 10^{-8}$ |
| Day 18 | 5 | 119 | $5.1 \times 10^{-8}$ |
| Day 21 | 12 | 131 | $4.1 \times 10^{-8}$ |
| Day 22 | 4 | 135 | $4.1 \times 10^{-8}$ |
| Day 23 | 4.5 | 139.5 | $4.6 \times 10^{-8}$ |
| Day 24 | 5 | 144.5 | $5.1 \times 10^{-8}$ |
| Day 25 | 4 | 148.5 | $4.1 \times 10^{-8}$ |
| Day 28 | 9 | 157.5 | $3.1 \times 10^{-8}$ |
| Day 29 | 4 | 161.5 | $4.1 \times 10^{-8}$ |
| Day 30 | 3.5 | 165 | $3.6 \times 10^{-8}$ |
| Day 31 | 4 | 169 | $4.1 \times 10^{-8}$ |
| Day 32 | 4 | 173 | $4.1 \times 10^{-8}$ |
| Day 35 | 10 | 183 | $3.4 \times 10^{-8}$ |
| Day 36 | 4 | 187 | $4.1 \times 10^{-8}$ |
| Day 37 | 4 | 191 | $4.1 \times 10^{-8}$ |
| Day 38 | 4 | 195 | $4.1 \times 10^{-8}$ |
| Day 39 | 3 | 198 | $3.1 \times 10^{-8}$ |

What is claimed and sought to be secured by Letters Patent of the United States is:

1. A grout composition for admixture with water to form a gelled grout essentially impermeable to water comprising, where percentages are percent by weight of the composition before admixture with water:
   10–80% water-swellable clay;
   0–80% solid, essentially non water-swellable particulate filler; and
   5–20% by weight of the water-swellable clay dispersing agent for the water-swellable clay.

2. The composition of claim 1 wherein the dispersing agent is sodium pyrophosphate.

3. The composition of claim 1 wherein the water-swellable clay comprises bentonite.

4. The composition of claim 1 wherein the solid, particulate filler is pozzolanic in the composition.

5. The composition of claim 1 wherein the filler comprises an essentially non water-swellable colloidal clay.

6. The composition of claim 5 wherein the filler comprises calcium bentonite.

7. The composition of claim 1 wherein the water-swellable clay is a smectite clay.

8. The composition of claim 1 wherein the water-swellable clay is selected from the group consisting of bentonite, Beidellite, Nontronite, Hectorite, Saponite and Attapulgite.

9. A grout composition slurry settable to a flexible consistency after curing comprising, where percentages, unless otherwise indicated, are percent by weight of the composition of water, water-swellable clay and filler after admixture with water:
   25–85% water;
   15–50% water-swellable clay;
   0–25% solid, essentially non water-swellable particulate filler; and
   0.5–20% dispersing agent for the water-swellable clay, based on the weight of the water-swellable clay.

10. The composition of claim 9 wherein the solid, particulate filler comprises an essentially non water-swellable colloidal clay.

11. The composition of claim 10 wherein the filler comprises calcium bentonite.

12. A method of protecting a structure against penetration by water comprising mixing a slurry comprising, where percentages of water, water-swellable clay and filler are based on the total weight of those three components:
   35–70% water;
   30–40% water-swellable clay;
   0–25% essentially non water-swellable solid, particulate filler; and
   5–17% dispersing agent for the water-swellable clay, based on the weight of the water-swellable clay; and
   pumping the composition while in slurry form before complete gelling of the clay, to dispose the composition in contact with the structure so that the composition sets in contact with the structure substantially without shrinkage while maintaining flexibility of the composition after complete curing of the composition.

13. The method of claim 12 wherein the structure comprises a conduit disposed within a drill hole and wherein the composition in slurry form is pumped into an annular space defined between the conduit and an earthen formation formed by the drill hole, to cement the conduit into position within the drill hole while maintaining the composition flexible.

14. The method of claim 12 wherein the structure comprises a conduit disposed within an abandoned drill hole to cement the conduit in position and to prevent the conduit from collapsing.

15. The composition of claim 1 wherein the composition contains essentially no water-soluble silicate.

16. The composition of claim 1 wherein the composition contains essentially no additional component capable of gelling the water-swellable clay.

17. The method of claim 12 wherein the slurry contains essentially no water-soluble silicate.

18. The method of claim 17 wherein the slurry contains essentially no additional gelling agent for the water-swellable clay.

* * * * *